(12) United States Patent
Kwiatkowski et al.

(10) Patent No.: US 9,069,829 B2
(45) Date of Patent: Jun. 30, 2015

(54) DATA ITEMS MANAGER

(75) Inventors: Paul J. Kwiatkowski, Redmond, WA (US); Shawn A. Van Ness, Renton, WA (US); Nicolas Brun, Seattle, WA (US); Michael A. Nelte, Redmond, WA (US); Arpit S. Shah, Bellevue, WA (US); Paul A. Gusmorino, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 13/010,779

(22) Filed: Jan. 21, 2011

(65) Prior Publication Data
US 2012/0191747 A1 Jul. 26, 2012

(51) Int. Cl.
*G06F 17/30* (2006.01)

(52) U.S. Cl.
CPC .................................. *G06F 17/3056* (2013.01)

(58) Field of Classification Search
CPC ................................................... G06F 17/3056
USPC .......................................................... 707/769
See application file for complete search history.

(56) References Cited

U.S. PATENT DOCUMENTS

| 5,864,850 | A * | 1/1999 | Nordman ................. 707/999.01 |
| 6,260,125 | B1 | 7/2001 | McDowell |
| 7,200,666 | B1 | 4/2007 | Nguyen |
| 7,480,654 | B2 | 1/2009 | Jujjuri et al. |
| 7,725,456 | B2 * | 5/2010 | Augustine ..................... 707/713 |
| 7,761,522 | B2 | 7/2010 | Shenfield et al. |
| 7,890,464 | B2 | 2/2011 | Reinsch |
| 2001/0049635 | A1 | 12/2001 | Chung |
| 2003/0120710 | A1 | 6/2003 | Pulsipher et al. |
| 2003/0131051 | A1 | 7/2003 | Lection et al. |
| 2003/0131073 | A1 | 7/2003 | Lucovsky et al. |
| 2003/0220984 | A1 * | 11/2003 | Jones et al. ................... 709/219 |
| 2004/0172423 | A1 * | 9/2004 | Kaasten et al. ............... 707/201 |

(Continued)

FOREIGN PATENT DOCUMENTS

| CN | 101848244 | 9/2010 |
| CN | 101901152 A | 12/2010 |
| JP | 2002259189 A | 9/2002 |

OTHER PUBLICATIONS

Gast, Holger, "Managing Proof Documents for Asynchronous Processing", Retrieved at <<http://www-pu.informatik.uni-tuebingen.de/users/gast/files/asyncdoc.pdf>>, Sep. 29, 2008, pp. 15.

(Continued)

*Primary Examiner* — Apu Mofiz
*Assistant Examiner* — Jared Bibbee
(74) *Attorney, Agent, or Firm* — Kevin Sullivan; Kate Drakos; Micky Minhas

(57) ABSTRACT

An items manager can request and receive data items from a data source via a data source adapter. The items manager can also maintain a list of data representation items representing data items. The data representation items can include user interface elements. Also, maintaining the list can include invoking a renderer to render the data representation items from the data items received from the data source, and including the data representation items in the list. The items manager can provide a client with an enumeration through the list of data representation items. The items manager may also provide other features, such as providing the client with notifications of changes to the list of data representation items.

20 Claims, 6 Drawing Sheets

(56) References Cited

U.S. PATENT DOCUMENTS

| | | |
|---|---|---|
| 2004/0205692 A1 | 10/2004 | Robinson |
| 2004/0230903 A1 | 11/2004 | Elza et al. |
| 2004/0267836 A1 | 12/2004 | Armangau et al. |
| 2005/0021572 A1 | 1/2005 | Ren et al. |
| 2005/0038791 A1 | 2/2005 | Ven |
| 2005/0055354 A1 | 3/2005 | Thompson et al. |
| 2005/0154847 A1 | 7/2005 | Trembecki |
| 2005/0216441 A1* | 9/2005 | Thomas et al. ............ 707/1 |
| 2005/0234997 A1 | 10/2005 | Gu et al. |
| 2006/0064634 A1 | 3/2006 | Dettinger et al. |
| 2006/0101082 A1* | 5/2006 | Agrawal et al. ........... 707/200 |
| 2006/0106888 A1 | 5/2006 | Iida et al. |
| 2007/0198602 A1 | 8/2007 | Ngo et al. |
| 2007/0208786 A1 | 9/2007 | Kim |
| 2007/0288531 A1 | 12/2007 | Motta |
| 2008/0016151 A1 | 1/2008 | Howard et al. |
| 2008/0134211 A1* | 6/2008 | Cui ............................ 719/318 |
| 2008/0140587 A1* | 6/2008 | Corning et al. ............ 705/36 R |
| 2008/0270486 A1 | 10/2008 | Hind et al. |
| 2009/0132956 A1 | 5/2009 | Mahasintunan |
| 2009/0164921 A1 | 6/2009 | Wagner et al. |
| 2009/0259695 A1 | 10/2009 | Gupta et al. |
| 2009/0279143 A1 | 11/2009 | St. Jacques, Jr. et al. |
| 2009/0327403 A1 | 12/2009 | Bhat et al. |
| 2010/0153339 A1 | 6/2010 | Wang |
| 2010/0229052 A1 | 9/2010 | Cuneo et al. |
| 2011/0055155 A1 | 3/2011 | Page et al. |
| 2012/0054158 A1 | 3/2012 | Hu et al. |

OTHER PUBLICATIONS

Seidenberg, et al., "A Methodology for Asynchronous MultiUser Editing of Semantic Web Ontologies", Retrieved at <<http://www.deltaflow.com/wp-content/pdf/kcapfp10-seidenberg.pdf>>, Oct. 28-31, 2007, pp. 8.

Ignat, et al., "Operation-Based Versus State-Based Merging in Asynchronous Graphical Collaborative Editing", Retrieved at <<http://www.loria.fr/~ignatcla/pmwiki/pub/papers/IgnatCEW04.pdf>>, Retrieved Date: Jan. 24, 2011, pp. 8.

Kwiatkowski, et al., "Change Notifications From An Updated Data Representation", U.S. Appl. No. 12/962,660, filed Dec. 8, 2010, pp. 37.

Kwiatkowski, et al., "Placeholders Returned for Data Representation Items", U.S. Appl. No. 12/962,662, filed Dec. 8, 2010, pp. 44.

Kwiatkowski, et al., "Optimistic Application of Data Edits", U.S. Appl. No. 13/111,951, filed May 20, 2011, pp. 48.

"Conventions for Bound Properties", Retrieved at << http://opensource.adobe.com/wiki/display/flexsdk/Conventions+for+Bound+Properties >>, Feb. 5, 2009, pp. 5.

"Flexible and Powerful Data Binding with WPF", Retrieved at << http://www.devx.com/codemag/Article/40316/1763/page/3 >>, Retrieved Date : Oct. 5, 2010, pp. 3.

Chawathe, et al., "Representing and Querying Changes in Semistructured Data", Retrieved at << http://ieeexplore.ieee.org/stamp/stamp.jsp?tp=&arnumber=655752 >>, Feb. 27, 1998, pp. 10.

"Data Replication for Backup Best Practices", Retrieved at <<http://searchdatabackup.techtarget.com/generic/0,295582,sid187_gci1349280,00.html >>, Mar. 2, 2009, pp. 3.

Hsiao, et al., "Tornado: A Capability-Aware Peer-to-Peer Storage Network", Retrieved at << http://urania.cs.ntou.edu.tw/~william/20071220/Tapestry/01213171.pdf >>, Proceedings of the International Parellel and Distributed Processing Symposium, Apr. 26, 2003, pp. 8.

Jansen, et al., "Data Locality in Parallel Rendering",Retrieved at << http://graphics.tudelft.nl/~fwj/PGV98.pdf >>,1998, pp. 15.

"Data Binding Overview", Retrieved at << http://msdn.microsoft.com/en-us/library/ms752347.aspx >>, Retrieved Date: Oct. 5, 2010, pp. 13.

Preguica , et al., "Integrating Synchronous and Asynchronous Interactions in Groupware Applications",Retrieved at << http://citeseerx.ist.psu.edu/viewdoc/download?doi=10.1.1.64.6145&rep=rep1&type=pdf >>, Proceedings of CRIWG, Sep. 2005, pp. 16.

Tretola, et al., "Extending Web Services Semantics to Support Asynchronous Invocations and Continuation", Retrieved at << http://ieeexplore.ieee.org/stamp/stamp.jsp?tp=&arnumber=4279601>>, IEEE International Conference on Web Services, Jul. 9, 2007, pp. 8.

"Configuring High Availability for Oracle Fusion Middleware SOA Suite",Retrieved at << http://download.oracle.com/docs/cd/E16764_01/core.1111/e10106/ha_soa.htm >>, Retrieved Date: Oct. 7, 2010, pp. 123.

Costa, et al., "TeenyLIME: Transiently Shared Tuple Space Middleware for Wireless Sensor Networks", Retrieved at << http://www.sics.se/~luca/papers/costa06teenylime.pdf >>, Proceedings of the international workshop on Middleware for sensor networks, 7th International Middleware Conference, Nov. 27-Dec. 1, 2006, pp. 6.

Jolla, LA., "MIRO Announces GOLD™ Version 2005", Retrieved at << http://www.mirotechnologies.com/news-and-events-detail.php?sec=6&sub=34&sub1=161 >>, Dec. 21, 2004, pp. 4.

Office Action, U.S. Appl. No. 12/962,662, filed Dec. 8, 2010, Mailing Date: May 11, 2012, pp. 21.

"International Search Report", Mailed Date: Jul. 18, 2012, Application No. PCT/US2011/063209, Filed Date: Dec. 4, 2011, pp. 9.

Office Action, U.S. Appl. No. 12/962,660, filed Dec. 8, 2010, Mailing Date: May 11, 2012, pp. 21.

Office Action, U.S. Appl. No. 12/962,660, filed Dec. 8, 2010, Mailing Date: Nov. 13, 2012, pp. 16.

Office Action, U.S. Appl. No. 12/962,660, filed Dec. 8, 2010, Notification Date: Oct. 9, 2013, pp. 14.

Office Action, U.S. Appl. No. 13/111,951, filed May 20, 2011, Notification Date: Sep. 27, 2013, pp. 20.

Office Action, U.S. Appl. No. 12/962,660, filed Dec. 8, 2010, Notification Date: May 7, 2013, pp. 14.

Office Action, U.S. Appl. No. 12/962,662, filed Dec. 8, 2010, Notification Date: Mar. 14, 2013, pp. 32.

Office Action, U.S. Appl. No. 13/111,951, filed May 20, 2011, Notification Date: Apr. 15, 2013, pp. 32.

Office Action, U.S. Appl. No. 12/962,660, filed Dec. 8, 2010, Notification Date: Feb. 20, 2014, 8 pages.

"Search Report", Date: Dec. 25, 2013, China Patent Application No. 201210018558.3, Filing Date Jan. 20, 2012, 2 pages.

Office Action, U.S. Appl. No. 13/111,951, filed May 20, 2011, Notification Date: Mar. 14, 2014, 39 pages.

Limbic~Region, "Patience Sorting to Find Longest Increasing Subsequence", on May 3, 2006, Last Comment Dated Oct. 7, 2009, 11 Pages.

Office Action, U.S. Appl. No. 12/962,660, filed Dec. 8, 2010, Notification Date: Jun. 26, 2014, 12 Pages.

Office Action Summary Form and Search Report, Chinese Patent Application No. 201210018558.3, Date of Office Action Issue: Sep. 22, 2014, 7 Pages.

Office Action, Chinese Patent Application No. 201210018558.3, MS 331558.02, Date of Office Action Issue: Apr. 8, 2015, 11 Pages.

* cited by examiner

DATA ITEMS MANAGER

BACKGROUND

Applications and/or controls may act as clients of local and/or remote data sources to display lists of items from those data sources. As used herein, a list is an ordered sequence of items, and a client can be an application and/or control. The data is obtained from each data source using one of many different interfaces or protocols, and presented to the end user with a user interface for navigating through and perhaps modifying the list. Depending on the data source, an item may be fetched using its index in the list and/or using a "key" that is different for each item and that does not change for the item. Some data sources, such as local data sources, can respond synchronously to requests for data, with the data source passing the requested data to the items manager before the items manager resumes execution. Such responses to data requests typically take less time than some response time threshold, such as a threshold that is low enough that a presentation of the response can appear to be in real time with the corresponding request. For example, such responses may take on the order of tens of milliseconds or less. Other data sources, such as remote data sources, may respond asynchronously, with the items manager resuming execution after the request and receiving the requested data from the data source at a later time. Such responses to data requests typically take more time than the response time threshold discussed above. The data source may or may not generate notifications for the application when changes are made to the data in the list. For example, web servers typically do not provide clients with change notifications when data is changed.

SUMMARY

The described embodiments include a module referred to herein as an items manager that can interact with a data source via another module referred to herein as a data source adapter, and can also interact with a client to provide a list of data representation items that represent data items from the data source. As used herein, a data item is an item provided by a data source. The data item may be in the same format as or a different format from a format in which a corresponding data item is stored in the data source. A data representation item is a representation of a data item, and a data representation item may be in the same format as or a different format from a data item that is being represented by the data representation item.

In one embodiment, the tools and techniques can include an items manager requesting data items from a data source via a data source adapter, and receiving data items from the data source via the data source adapter. The items manager can also maintain a list of data representation items representing data items received from the data source. Additionally, the items manager can provide a client with an enumeration through the list of data representation items. The items manager may also provide the client with notifications of changes to the list of data representation items.

In another embodiment, an items manager can request and receive data items from a data source via a data source adapter. The items manager can also maintain a list of data representation items representing data items received from the data source. The data representation items can include user interface elements. Also, maintaining the list can include invoking a renderer to render the data representation items from the data items received from the data source, and including the data representation items in the list. The items manager can provide a client with an enumeration through the list of data representation items.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
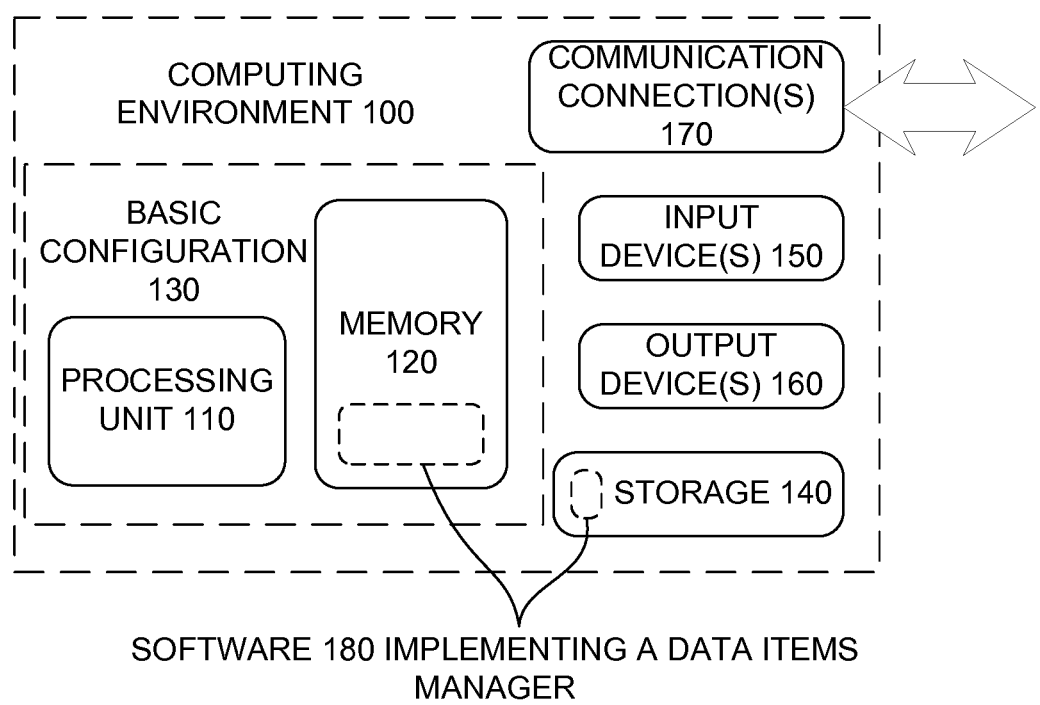
FIG. 1 is a block diagram of a suitable computing environment in which one or more of the described embodiments may be implemented.

Embodiments described herein are directed to techniques and tools for improved handling of a list of data representation items for a client. Such improvements may result from the use of various techniques and tools separately or in combination.

Such techniques and tools may include an items manager that can interface with a data source through a data source adapter to obtain data items. The items manager can also interface with a client to provide the client with an enumeration through a list of data representation items that represent the data items. The items manager can provide one or more of the features discussed herein. For example, the data representation items may be user interface elements that represent the data items.

The items manager may support synchronous enumeration of the list of data representation items, even when the data representation items are representing data items from an asynchronous data source. For example, this may be done using placeholders, as will be discussed more below. As used herein, a placeholder is an object that is returned to the client in lieu of a requested data representation item. A placeholder can take any of various forms. For example, the placeholder(s) and the actual data representation items in a cache maintained by the items manager may be in the form of rendered user interface elements. Alternatively, the placeholders and/or data representation items may take some other form, such as the form of opaque handles, or some other data type. Additionally, placeholders in a local data representation used by the items manager may be in a different form from the placeholders returned to the client in response to requests from the client.

The items manager may also provide the client with notifications of changes to the data representation items, even when the items manager is interfacing with a data source that does not provide such notifications for the represented data items. The items manager may also allow the loading of resources for data representation items to be prioritized, and may also delay providing a data representation item to the client until resources for that data representation item have been loaded. Moreover, the items manager may provide for synchronous updates to the data representation items, even with asynchronous data sources. The items manager may provide the client with a self-consistent snapshot of the data (e.g., without duplicate indices), even with asynchronous data sources that might be changing rapidly. The items manager may also include one or more features to improve tolerance of poor network connections and other failures.

The items manager may interface with a data source adapter to allow a data source to return fewer or more items than were requested by the items manager. Also, the items manager may request overlapping subsets of the list of data representation items. The overlap may be used by the items manager to keep track of positioning in the list without the data source maintaining a cursor, and it may also be used by the items manager to detect changes to the list.

The items manager may interface with a data source, whether the data source supports indices into the list of data items at the data source and/or allows items to be fetched using "keys" that are different for each data item and that do not change for the item. The items manager may also provide data virtualization, which can include fetching data items as they are requested by the client, and by releasing data representation items that are no longer being used by the client. This may reduce bandwidth and memory used for maintaining the list of data representation items. Additionally, the items manager may implement hydration (dehydration and rehydration) of user-modified state for the data representation items. For example, the state can be changes made in response to user input that can be dehydrated by being stored in a location, such as in memory and/or long-term storage. The state can represent changes to the data representation item, such as changes in response to user input. The items manager can remove the data representation from the list (e.g., by deleting the representation and/or removing the entire list from memory), and can re-insert the data representation item back into the list later. The items manager can rehydrate the state back into the data representation item. This may be done before or after the data representation item is re-inserted in the list. Alternatively, the items manager may provide notifications to allow the client to perform dehydration and rehydration of state.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as an environment for the client, items manager, data source adapter, and/or data source discussed herein. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing a data items manager.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "request," and "receive" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Data Items Manager System and Environment

Figure 2:
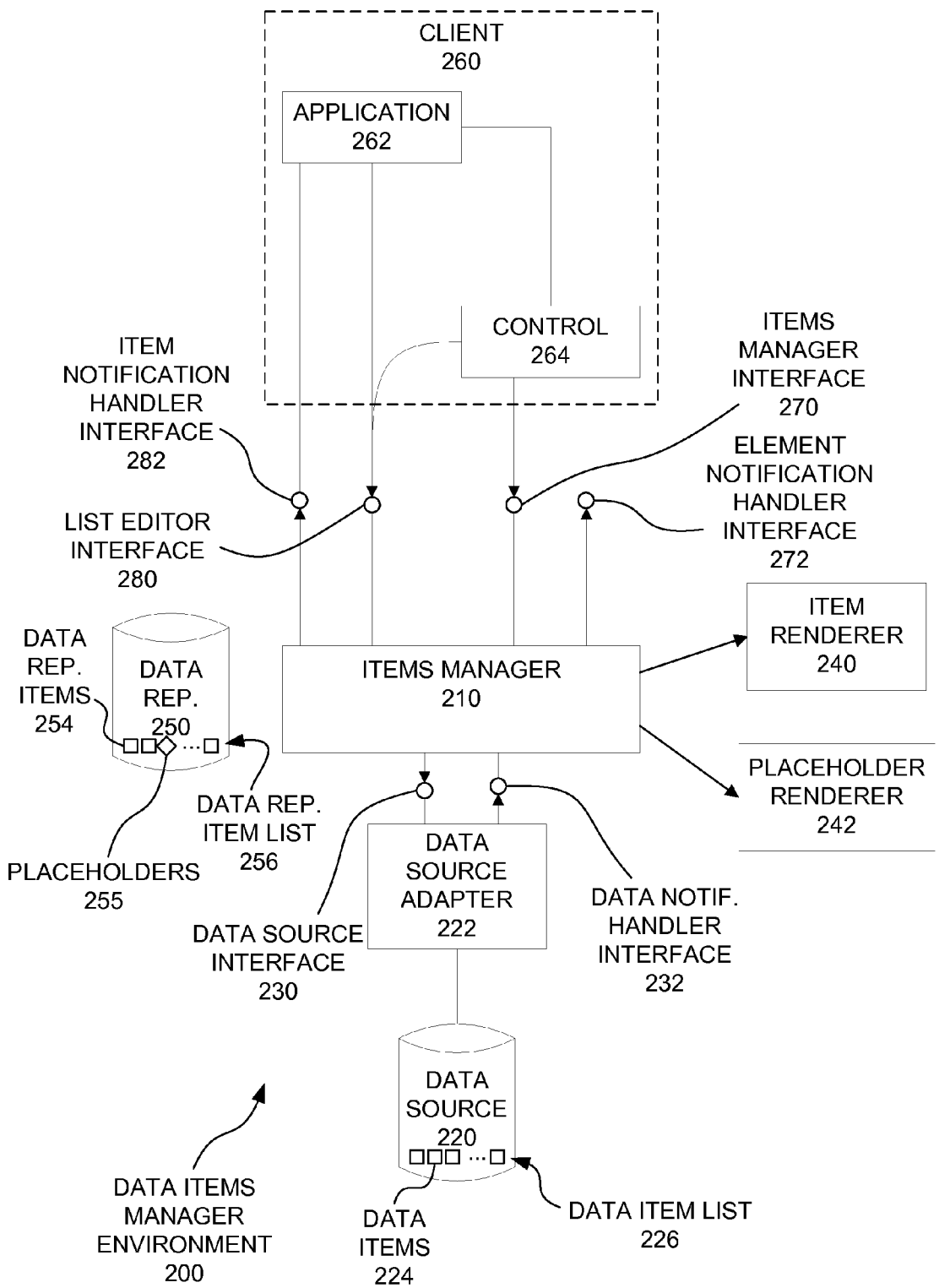
FIG. 2 is a schematic diagram of a data items manager system or environment.

FIG. 2 is a schematic diagram of a data items manager system or environment (200) in conjunction with which one or more of the described embodiments may be implemented. A summary of the environment (200) will now be provided, followed by a more detailed description of the environment (200).

A. Summary of Data Items Manager Environment

The environment (200) can include an items manager (210) that can be configured to interact with a data source (220) through a data source adapter (222). The data source adapter (222) can be specifically configured to interact with a particular type of data source (220), or even a particular instance of a data source (220). The data source (220) can manage data items (224) in a data item list (226). The items manager (210) can make a call to a data source interface (230), to fetch data items (224) from the data source (220) through the data source adapter (222). Additionally, the data source adapter (222) can make a call to a data notification handler interface (232) to notify the items manager (210) of changes to the data items (224), if the data source (220) is capable of issuing such notifications.

The items manager (210) can also interact with an item renderer (240) and a placeholder renderer (242). For example, the renderers (240 and 242) can produce items for a local data representation (250) that represents at least a portion of the data item list (226) in the data source (220). For example, the items manager (210) may call the item renderer (240) to render data items (224) as data representation items (254). If the data source (220) and data source adapter (222) do not synchronously return requested data items (224), the items manager (210) may call a placeholder renderer (242) to render placeholders (255) to be used instead of actual data representation items (254) until the corresponding data items (224) are returned. The placeholders (255) and data representation items (254) can be included in a data representation item list (256), which can be managed by the items manager (210). Also, the items manager (210) can make the data representation items (254) and placeholders (255) of the data representation item list (256) available to a client (260), providing the client with an enumeration of the data representation item list (256).

The client (260) may include an application (262), a control (264), or a combination thereof. In the illustrated embodiment of FIG. 2, the client (260) includes an application (262) and a control (264). However, the client (260) may include just an application, or just a control. In the embodiment of FIG. 2, the control (264) can call an items manager interface (270) to request data representation items (254) (this may be thought of as either requesting the data items (224) themselves, or requesting the data representation items (254)) from the items manager (210). Additionally, the items manager (210) can call an element notification handler interface (272) to notify the control (264) of changes to the data representation item list (256). Additionally, a list editor interface (280) can be called by the control (264) or the application (262) to request that changes be made to the data representation item list (256) and the data item list (226). Also, an item notification handler interface (282) can be called by the items manager (210) to provide notifications to the application (262), such as notifications on the state of the items manager (210), and notifications to dehydrate and rehydrate the state of data representation items (254) if the client (260) is to perform these tasks.

In practice, the client (260) can request data representation items (254) through the items manager interface (270). The items manager (210) can in turn fetch the corresponding data items (224) from the data source (220) through the data source adapter (222). The data items (224) can be returned via the data source adapter (222), and can be instantiated as data representation items (254) by the item renderer (240) and included in the data representation item list (256). The items manager (210) can provide the data representation items (254) to the client (260), such as by providing the client (260) with pointers to the items in the local data representation (250). The client (260) can also request through the list editor interface (280) that changes be made to the data representation item list (256), and to the data item list (226). The items manager (210) can make those changes to the data representation item list (256), and can request that the data source (220) make the changes to the data item list (226) by calling the data source interface (230) and requesting the changes via the data source adapter (222). Also, the data source (220) may inform the items manager of changes to the data item list (226) through the data notification handler interface (232), and the items manager (210) can inform the client (260) of changes to the data representation item list (256) through the element notification handler interface (272).

B. Details of the Data Items Manager Environment

The items manager (210) can be a module that is implemented in a standard language and format, such as in an ECMAScript text file. Alternatively, the code for the items manager may be in some other format, such as in a dynamically linked library, or the items manager could be incorporated more closely into an application itself, such as in a static library. The items manager may be a re-usable module. The term re-usable refers to the items manager being a module that can be plugged into various different environments to interact with a client and a data source. In such different environments, the client and/or data source may be configured differently, but the items manager is still able to provide an interface for the client and the data source. For example, the items manager may be included in code for a client application, the items manager may be a separate component from the client but be running in the same process as the client, the items manager may be included in an environment where it runs in a separate process from the corresponding client, etc.

The data items (224) may be in any of various different formats, and may be translated as they are passed within and/or between components of the environment (200). For example, the data source adapter (222) may translate the data items (224) into an ECMAScript object that may have as properties a JSON (JavaScript Object Notation)-serializable ECMAScript object that represents the item data and a string (or other data structure) that serves as a key for the item. Each such key can be a value that does not change for the data item, and that is different from keys for the other data items in the data set in the data source (220). For example, the keys may be keys made up by the data source (220) for recordkeeping, or they may be identifiers such as driver's license numbers, social security numbers, etc. To the extent such keys represent sensitive information, the keys can be protected with appropriate security measures such as encryption techniques. The keys can be used by the items manager for recordkeeping, such as distinguishing and/or matching corresponding data items and/or data representation items. The item renderer (240) may instantiate the data representation items (254) in one of various forms, such as the form of an HTML Document Object Model (DOM) element sub-tree.

1. Data Source Interface

The data source adapter (222) can be a client-side module that interfaces with the data source (220) and provides the data source interface (230) to the items manager (210). The data source interface (230) can implement methods to be performed by the data source adapter (222) when called by the items manager (210). Examples of pseudo code for these and other methods will be given herein. It is to be understood that the naming conventions, arrangement of the methods, and even the overall arrangement of modules in FIG. 2 may be implemented in other ways. With that in mind, following is an example of one of these methods, itemsFromKey, shown in pseudo code for a call to the method:

```
void itemsFromKey(string key, Integer countBefore, Integer countAfter,
    function void itemsAvailable(
        Array results,
        Integer offset,
        Integer count,
        Integer index
    )
);
```

In this method, a data item (224) indicated by a string "key" is being requested, along with a number (Integer countBefore) of data items (224) before the data item (224) with the given key and a number (Integer countAfter) of data items (224) after the data item (224) with the given key in the data item list (226). Accordingly, this defines a range of data items (224) in the list that are being requested. However, the data source (220) may be allowed to return more or fewer data items (224) than are indicated in this range, possibly within some constraints. For example, the data source (220) may return at least the data item (224) indicated by the given key and one item before and one item after (if Integer countBefore and Integer countAfter each have a value of at least one).

As indicated in the pseudo code above, the itemsFromKey method can also pass a callback function called itemsAvailable, which the data source adapter (222) can call when data items (224) from the data source (220) are available. The data source adapter (222) may call the itemsAvailable callback function synchronously or asynchronously to return data items (224), depending on whether the data items (224) can be returned synchronously. In calling this function, the data source adapter can include an array of one or more data items (224) in "results". The data items (224) in the array "results" can be arranged in the same order that the included data items are in the data item list (226). Each data item (224) in the results can include a key and a data object, in the following form: {key: " . . . ", dataObject: . . . }. The call to the itemsAvailable function can also indicate the offset (the integer "offset") of the data item (224) indicated by the given key in the array "results". For example, if the data item (224) with the given key in the array "results" is the third item in the array, then the integer "offset" can have a value of two. This can allow the items manager (210) to locate the data item (224) with the given key within the results. The data source adapter (222) may also include a count (the integer "count") of the number of data items (224) in the overall data item list (226) at the data source (220), if such a count is currently known by the data source (220) and provided to the data source adapter (222). The data source adapter (222) may also include an index (the integer "index") of the data item (224)

with the given key, which can indicate the position, or offset, of the data item (224) with the given key within the overall data item list (226).

In addition to itemsFromKey, the data source adapter (222) may implement other methods that can be called through the data source interface (230) to retrieve data items (224). These other methods may be similar to the itemsFromKey method, but the indicated item may be indicated in other ways. For example, the data source adapter (222) may implement itemsFromEnd, through which the items manager (210) can request a range of data items (224) starting from the end of the data item list (226) and counting back by a specified count (an integer "count"), as indicated by the following pseudo code for a call to the method (with the details of the callback function itemsAvailable removed): "void itemsFromEnd(Integer count, function void itemsAvailable( . . . ))". As another example, the data source adapter (222) may implement itemsFromStart, through which the items manager (210) can request a range of data items (224) starting from the start of the data item list (226) and counting forward by a specified count (an integer "count"), as indicated by the following pseudo code for a call to the method (with the details of the callback function itemsAvailable removed): "void itemsFromStart(Integer count, function void itemsAvailable( . . . ))". As yet another example, the data source adapter (222) may implement itemsFromIndex, through which the items manager (210) can request a range of data items before (indicated by the integer countBefore) and after (indicated by the integer countAfter) a data item (224) having a specified index (indicated by the integer "index"), as shown in the following pseudo code for a call to the method: "void itemsFromIndex(Integer index, Integer countBefore, Integer countAfter, function void itemsAvailable ( . . . ))". As yet another example, the data source adapter (222) may implement itemsFromPrefix, through which the items manager (210) can request a range of data items before (indicated by the integer countBefore) and after (indicated by the integer countAfter) a data item (224) having a specified prefix or description (indicated by the string "prefix"), as shown in the following pseudo code for a call to the method: "void itemsFromPrefix (string prefix, Integer countBefore, Integer countAfter, function void itemsAvailable ( . . . ))".

The data source adapter (222) may implement all these methods, or fewer than all of them. Also, the data source adapter (222) may implement other methods in addition to or instead of those discussed above. For example, the environment (200) may be configured so that the data source at least implements either the itemsFromIndex method, or the itemsFromKey and itemsFromStart methods.

The data source (220) and data source adapter (222) can be configured to return at least the requested item (if it exists) in the results array. The range parameters (the integers count, countBefore, and countAfter) can be construed by the data source adapter (222) and data source (220) as hints from the Items Manager that tell the data source (220) what items it is trying to obtain. The data source (220) can be free to return fewer or more items in each case. However, if a range parameter is greater than zero, the data source (220) and data source adapter (222) can be configured to return at least one additional item in the direction indicated by the parameter.

When requesting a portion of the data item list (226), the items manager (210) can request an overlapping portion of an adjacent region in the data item list (226) that it has already fetched. The items manager (210) can use this overlapping information to provide "next/prev" enumeration to the client (260), even if the data source (220) does not support indices. The items manager (210) can also use the overlapping information to detect changes to the data item list (226), which may prompt the items manager (210) to trigger a refresh operation (discussed more below). When results of data items (224) are passed to the items manager (210), the items manager (210) can verify that the results do not conflict with the portion of the data item list (226) that the items manager (210) has cached in the form of the data representation item list (256). For example, if the items manager (210) determines from the data representation item list (256) that two data items (224) are adjacent (such as where the data representation items (254) for those items are adjacent in the data representation item list (256)), but the two data items (224) are not adjacent in the results array, this can indicate a contradiction. Similarly, if an index for a data item (224) has changed, this can indicate a contradiction. In the event of a contradiction, the items manager can begin a refresh operation (discussed more below) to obtain a consistent view of the data, and can generate change notifications for the client (260). By avoiding reporting contradictory results to the client (260) until enough information to resolve the contradiction has been fetched, the items manager can present a self-consistent representation of the data items (224), even if that representation may be at times out of date.

2. Data Notification Handler Interface

The data source adapter (222) may also call methods on the data notification handler interface (232), which is an interface through which the data source adapter (222) can notify the items manager (210) of changes to the data item list (226) (or to simply tell the items manager (210) that something changed so that a refresh operation can be initiated by the items manager (210)). All such notifications can be optional (e.g., many web data sources do not provide such notifications), and consistency can be maintained in some other way. For example, the client (260) can periodically tell the items manager (210) to "refresh" all data the items manager (210) has instantiated to see if anything has changed, as will be discussed more below.

3. Renderer Interfaces

As noted above, the items manager (210) can invoke the item renderer (240) to instantiate data items (224) as data representation items (254), and the items manager (210) can invoke the placeholder renderer (242) to instantiate placeholders (255). In one implementation, the interface between the items manager (210) and the renderers (240 and 242) may be implemented by the renderers (240 and 242) being functions that can be called by the items manager (210). The item renderer (240) can accept a data item (224) and return a data representation item (254), which can be a user interface element, such as a user interface element that is a tree made up of smaller user interface elements. For example, the output of a renderer (240 or 242) can be an HTML string or a tree of DOM elements. However, other user interface frameworks could alternatively be used. For example, one or both of the renderers (240 and/or 242) could produce rendered outputs other than user interface elements.

The items manager (210) may pass an item's index (or a function for obtaining the item's index) to the placeholder renderer (242) when calling the placeholder renderer (242) to instantiate a placeholder (255). However, even the index may not be passed if it is not known. This is because a placeholder (255) is used in place of the data representation item (254) until the corresponding data item (224) can be fetched. Accordingly, little, if any, information may be known about the data item (224) corresponding to the placeholder (255). The placeholders (255) can act as handles that represent the true data representation item's (254) position in the data representation item list (256). When the data representation item (254) is available, the items manager (210) can pass the client (260) a pointer to the placeholder (255) and to the data representation item (254), and can tell the client (260) to replace that placeholder (255) with the proper data representation item (254). When the items manager (210) requests data from the data source (220), the items manager (210) can detect whether the data source (220) returns the result synchronously (i.e. with a reentrant call), and if so the items manager (210) can refrain from creating a placeholder (255), because the actual data representation item (254) can be returned synchronously.

4. Items Manager Interface

The items manager interface (270) can provide the client (260) with an enumeration of the data representation item list (256), which represents at least a portion of the data item list (226) at the data source (220). The enumeration can be synchronous even if the data source (220) does not respond synchronously, because the client is actually enumerating the data representation item list (256). The enumeration can start from the beginning or end of the data item list (226) (i.e., at a point in the data representation item list (256) representing the beginning or end of the data item list (226)), or at some other position such as a data representation item (254) with a given index or key.

The enumeration methods of the items manager interface (270) can return data representation items, and some can accept identifiers of data items (224) or data representation items (254) as parameters. Following are some examples of pseudo code for calls to methods for returning a specified data representation item from the data representation item list (256) (each of which represents a data item (224) in the data item list (226)): "Element previousItem(Element item)", which returns the data representation item (254) representing the data item (224) that is immediately prior to the specified data representation "item"; "Element firstItem( )", which returns the data representation item (254) representing the first data item (224) in the data item list (226); "Element nextItem(Element item)", which returns the data representation item (254) representing the data item (224) that is the next item after the specified item in the data item list (226); "Element lastItem( )", which returns the data representation item (254) representing the last data item (224) in the data item list (226); "Element itemFromKey(string key)", which returns the data representation item (254) representing the data item (224) with the specified key; "Element itemFromPrefix(string prefix)", which returns the data representation item (254) representing the data item (224) with the specified prefix or description; and "Element itemAtIndex(Integer index)", which returns the data representation item (254) representing the data item (224) with the specified index.

For each of these methods, the item returned may be a placeholder (255) or a data representation item (254), depending on whether the data was available at the time of the call (for example, if the item renderer (240) had already been called for the item, then the data representation item (254) from that call can be returned). The use of placeholders (255) will be discussed more below.

5. Element Notification Handler Interface and Refresh Operations

A data representation item (254) (or placeholder (255)) can only be used to represent a data item (224) as long as the data representation item (254) is recognized as such by the items manager (210). Accordingly, the client (260) can be informed of changes to the data representation item list (256). For example, if a placeholder (255) was returned to the client (260) by the items manager (210) in response to an enumeration method being called, and the requested data representation item (254) is now available (and all of the resources it requires have been fetched, as discussed below), the method can be called through the element notification handler interface (272) to inform the client (260).

Following is an example of pseudo code for such a call: "void itemAvailable(Element item, Element placeholder)", where "item" is the data representation item (254) (which may be a pointer to the data representation item (254) in the data representation item list (256)), and "placeholder" is the placeholder (255) being replaced by the data representation item (254) (which may also be a pointer to the placeholder (255)) in the data representation item list (256). Note that this is a separate method from the itemsAvailable callback discussed above. Where the data representation items (254) and placeholders (255) are user interface elements, the element notification handler interface (272) can replace the placeholder (255) in the user interface with the data representation item (254) being passed in. From that point on, the placeholder (255) can be unrecognizable as a valid item parameter by the items manager (210).

The items manager (210) can initiate a refresh operation that can generate a set of change notifications when data representation items are updated. To begin the refresh operation, an updated representation of an updated set of data in the data source (220) can be fetched by the items manager (210). A change notification set can be generated by comparing the updated representation with an original representation. The change notification set can represent a possible set of changes that yield the updated representation when starting with the original representation. The possible set of changes can include fewer changes than an alternative set of changes that would, for example, represent deletion of all items in the original set of data and insertion of all items in the updated set of data. The change notification set can be sent to the client (260) via the element notification handler interface (272).

The items manager (210) can present to the client (260) an interface that behaves as if the data source (220) provides synchronous change notifications, whether or not the data source (220) actually does. This may be done in three main steps to be performed by the items manager (210): detecting that the current local data representation (250) is out of date compared to the data item list (226) in the data source (220), fetching an updated representation in the form of data representation items (254) to replace all or part of the local data representation (250), and comparing the original and updated versions of the updated local data representation (250) to generate the change notifications. Each of these will be discussed below.

a) Detecting Out-of-Date Local Data Representation

Detecting that the local data representation (250) is out of date may be bypassed if a refresh operation (i.e., fetching an updated representation in the form of data representation items (254) to replace all or part of the local data representation (250), and comparing the original and updated versions of the updated local data representation (250) to generate the change notifications) is requested, such as by the client (260). The client (260) can request a refresh operation via the items manager interface (270), such as by calling a method (e.g., by calling "void refresh( )"). For example, the client (260) may be configured to periodically request a refresh operation, or a refresh operation may be requested by user input. Additionally, the items manager (210) or the adapter (222) can initiate a refresh operation autonomously, such as when the items manager (210) or the adapter (222) has detected that the local data representation (250) is out of date.

For example, an out-of-date local data representation (250) may be detected when the client (260) requests additional data representation items (254). The items manager (210) may request an overlapping portion of the already-fetched local data representation (250) in addition to requesting the new data items (224) requested by the client (260). The items manager (210) can process batches of data items (224) when they arrive from the data source (220). Each time a batch arrives, the items manager (210) can compare overlap, if any, with data representation items (254) representing previously-returned data items (224) for consistency. For example, if a data representation item K was previously after an item J, but now it is after an item H, something has changed, even if the client's most recent request was for item K only. If indices are provided for data items (224) in a list, a change in a data item's index can also indicate a change to one or more other data items (224) in the data item list (226).

The items manager (210) may attempt to determine what has changed and fetch a subset of the new data that is determined to have changed. Alternatively, all the data representation items (254) that are in the local data representation (250) (which may be all the data representation items (254) that the client (260) is currently maintaining handles to) can be re-fetched by the items manager (210). A discussion of this fetching follows.

b) Fetching Updated Data Representation

When fetching an updated data representation as part of a refresh operation, the items manager (210) can enter a different mode of operation. In this mode, the items manager (210) can ignore data items (224) that arrive due to requests that were sent before this mode was entered. Additionally, while in this mode, the items manager (210) may communicate with the data source (220) to fetch batches of data until the items manager (210) has a consistent "snapshot", i.e., a complete updated local data representation (250) of the portion of the data in the data source (220) that corresponds to the original local data representation (250) (i.e., the local data representation already available to the items manager (210)). Various heuristics could be used by the items manager (210) to obtain such a snapshot. In one implementation, which can be used for lists of data representation items, attempts to re-obtain an instantiated sub-list in as few requests as possible can be performed, and the items manager (210) can examine each batch of results to see what still needs to be requested. In this approach, a data representation item (254) in the original local data representation (250) may be considered deleted if a request for that specific item fails, but until such a failure occurs or the data representation item (254) is successfully re-fetched, the item can be considered an item that is still to be fetched in the refresh operation.

If the items manager (210) finds a contradiction between batches of received data items (224), the fetching process can begin anew and data items (224) for all the data representation items (254) in the local data representation (250) can be requested once again. For example, this may occur if data changes in the data source (220) between times when different batches are sent.

While the items manager (210) is in its refresh mode, it can discontinue requesting new data items (224) from the data source (220). However, the items manager (210) can continue to process requests from the client (260) by returning placeholders (255) in response to the requests. Alternatively, the items manager (210) may fulfill some client requests if the fulfillment of those requests is accounted for in the process of performing the refresh operation.

c) Compare Representations and Generate Change Notifications

Generating the change notifications may be done in any of various ways. For example, the set of change notifications could represent the deletion of all the data representation items (254) in the original local data representation (250) and the insertion of all the data representation items (254) in the updated local data representation (250). However, such a set of change notifications may not provide the client (260) with enough information to communicate the changes to users in helpful ways.

Alternatively, the items manager (210) can generate a set of change notifications representing a set of changes that is plausible even if the true sequence of changes to the data set in the data source (220) is unknown to the items manager (210). This may be done by the items manager (210) using techniques that can decrease the number of changes represented by the change notifications, so that the number of changes is less than other potential sets of changes, such as if the changes included the deletion of all the data representation items (254) in the original local data representation (250) and the insertion of all the data representation items (254) in the updated local data representation (250). The client (260) can use such a set of change notifications to communicate the changes to users in various ways. For example, the client (260) may provide animations to highlight the changes. Additionally, the client (260) can communicate the changes in other ways. For example, if an item that happened to be displayed at the top of a screen showing a list of data representation items (254) is moved to another part of the data set in the data source (220), the client can leave the visible window scrolled to its original location (and show all the subsequent data representation items (254)), rather than scrolling the window just to keep that one item at the top of the screen.

Following is a description of one implementation of a technique that the items manager (210) can use to generate the change notifications. Overall, this technique can gradually alter the original local data representation (250) until it matches the updated local data representation (250). This technique will be described with reference to FIG. 3, which illustrates a specific example of a portion of an original local data representation (310), received updated data items (320) that were fetched in a refresh operation, and a resulting portion of an updated local data representation (330) after the list generation technique has been run.

Figure 3:
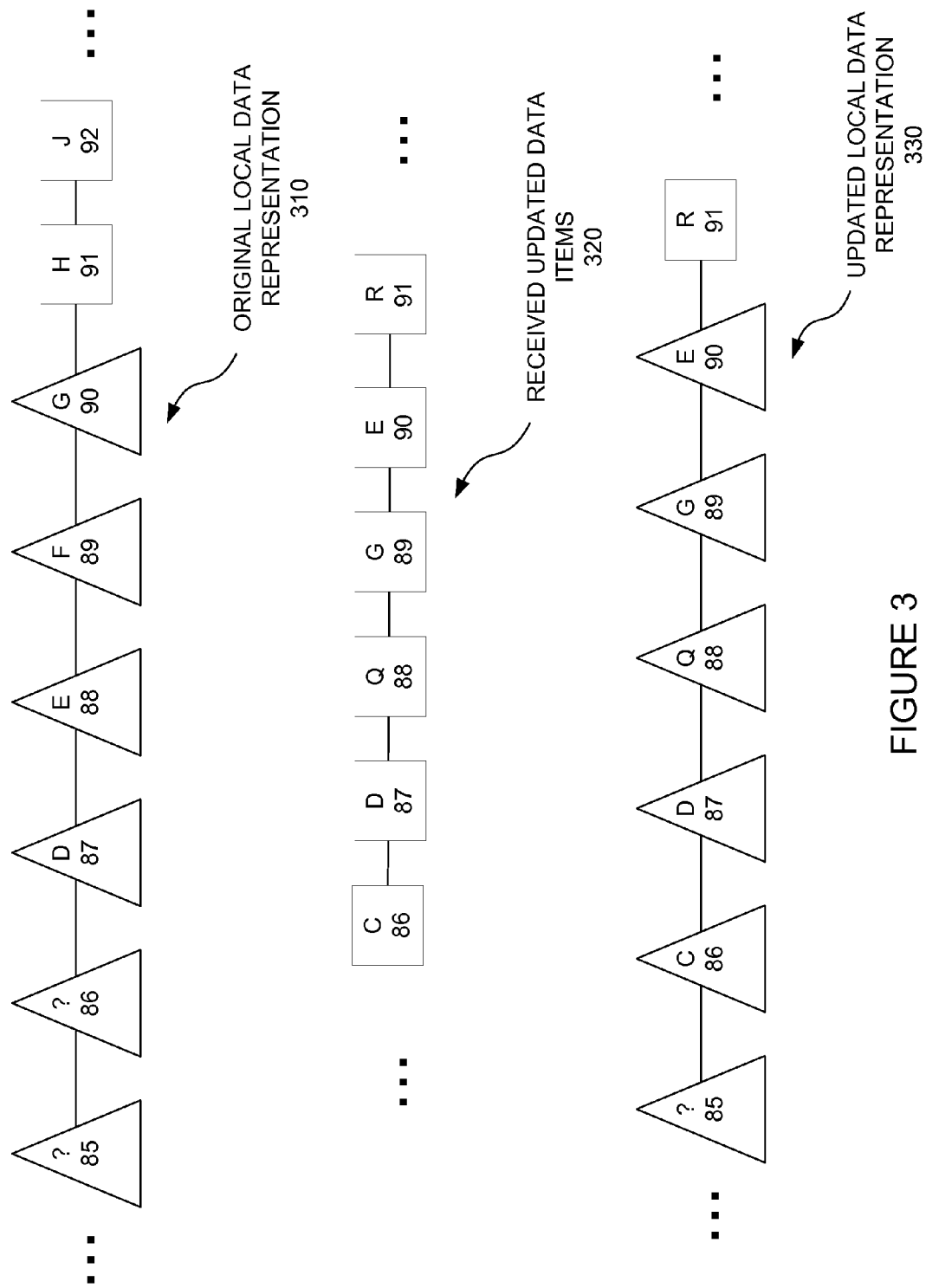
FIG. 3 is a schematic diagram of a portion of an original local data representation, received updated data items list that were fetched in a refresh operation, and a resulting portion of an updated local data representation after a list generation technique has been run.

In FIG. 3, items are listed in their order in the representation, which may also be in order of the items' indices, as illustrated. In FIG. 3, triangles with question marks illustrate placeholders, triangles with capital letters illustrate data representation items that have been requested by the client and instantiated (e.g., rendered as UI descriptions that are sent to the client), and boxes with letters illustrate data representation items that have been returned from the data source but not requested by the client and not yet instantiated. The numbers below the question marks or capital letters indicate the index numbers for the items in the overall data set in the data source. Additionally, the capital letters can represent keys for the data representation items.

The original data representation (310) is illustrated as including two placeholders with indices 85 and 86 (representing items that had been requested by the client but not yet returned by the items manager), followed by instantiated data representation items D, E, F, and G with respective indices 87, 88, 89, and 90, and then followed by unrequested data items H and J, with respective indices 91 and 92. The received updated data items (320) include items C, D, Q, G, E, and R with respective indices 86, 87, 88, 89, 90, and 91. The received updated data items (320) can be compared to the original local data representation (310) to generate change notifications to be sent to the client. A technique for generating those change notifications will now be described.

In the technique, items that appear in the original local data representation (310), but not in the received updated data items (320), can be found. Remove-type change notifications can be sent for such items, and the items can be removed. For example, a remove-type notification for item F can be sent to the client, and item F can be removed from the local data representation. During this operation, access of the client can be limited so that the client is not permitted to observe indices on the items because such indices may be inconsistent. Alternatively, a client may be permitted to see such indices if the indices are changed and the client is informed of the index changes when other changes are made that may affect the indices. As yet another alternative, a client may be allowed to see indices even if the indices are inconsistent.

The technique can further include finding placeholders generated for items requested by index, and matching those placeholders to those items. For example, if the placeholders with indices 85 and 86 in the original local data representation were requested by index, this could include matching the placeholder having an index of 86 in the original local data representation (310) with the item C having the index 86 in the received updated data items (320). This can be done before moving placeholders in the data representation to prevent placeholders for items requested by index from moving, because such movements of index-requested placeholders could result in a placeholder being matched with an item having an index other than the one requested.

While not illustrated in FIG. 3, the received updated data items (320) may be spread across multiple non-contiguous ranges. For example, this may occur because the client may be allowed to retain handles to non-contiguous ranges, so the original local data representation (310) may include multiple non-contiguous ranges of representation items requested by the client. Additionally, the items manager may request only a limited range around each item in the original local data representation (310). The technique can include determining a match for each range in the received updated data items. For example, the match can include a range in the original local data representation (310) that shares the most individual items with the matching range in the received updated data items (320). In some cases, ranges in the original local data representation (310) may be merged if the merged range maps to a range in the received updated data items (320).

In the received updated data items (320), boundaries of each range outside which all items do not appear in the original local data representation (310) can be marked. For example, this can include marking a boundary between items E and R in and between items C and D in the received updated data items (320). These boundaries can distinguish between items that appear to have simply not been observed yet (e.g., items C and R) and items that have been inserted into the data set in the data source (e.g., item Q).

Of the items that appear in each range of the received updated data items (320) and its matched range in the original local data representation, a set of items that do not need to be moved relative to one another can be identified and marked as being stationary. This can be done in such a way that the number of such stationary items is increased and accordingly the number of move-type change notifications can be decreased. For example, with a list this can include assigning ordinals to the items in the original local data representation (310), and then finding the "longest ordered subsequence" of those ordinals in the received updated data items. As an example, this can be done using a portion of the known "patience sorting" technique. In the illustrated example of FIG. 3, this can result in identifying D and G as stationary, where D and G form the longest ordered subsequence. (Alternatively, the technique could have identified D and E as stationary with the same size ordered subsequence.)

If there are placeholders inside the marked boundaries discussed above, attempts can be made to match these placeholders to items in the received updated data items (320) that do not appear in the original local data representation (310), based on neighbors that appear in both data sets. For example, if the placeholder with index 86 had not already been matched with item C because of matching index values, that placeholder could be matched with item C because item C and the placeholder have the same neighbor (item D).

The technique may include sending a move-type change notification for the non-stationary items that are in both the received updated data items (320) and the original local data representation (310). The moves can be performed in the local data representation. For example, this can include sending a move-type notification for item E and moving item E to be after item G in the local data representation. When generating and sending these notifications, the client's access can be limited. For example, the client may be allowed to observe the neighbors of an item, but not the indices for the items.

The technique can further include finding new items that appear in the received updated data items (320), but not the original local data representation (310). These new items can be added to the local data representation, and corresponding inserted-type change notifications can be sent to the client. For example, in FIG. 3, item Q can be inserted after item D and an inserted-type change notification can be sent to the client. As with moves, the client's access can be limited when performing insertions. For example, the client can be allowed to observe the neighbors of any item, but not indices for items.

Additionally, the technique can include comparing contents of items that appear in both the original local data representation (310) and the updated local data representation (330). For items whose contents have changed, the items can be updated in the local data representation and changed-type change notifications can be sent to the client. Again, the client's access can be limited during this operation, so that anything except indices can be observed by the client.

The technique can further identify items that appear in the original local data representation (310) and the updated local data representation (330) whose indices have changed. For example, in the example of FIG. 3, indices for items E and G can be changed and index changed-type change notifications can be sent to the client. During this operation, the client's access can be limited so that it can observe the old and new index of the changing item, but no other indices.

The technique can also include matching placeholders, which have not yet been matched to an item and are on the periphery of ranges in the original local data representation (310) to items outside the marked boundaries of the received updated data items (320). Indices of placeholders from the original local data representation (310) can be updated based on the items they are matched to, or their adjacency to instantiated items or other placeholders. After this is done, limits on the client's access can be removed, and the client can be allowed to access the local data representation in the client's usual manner.

Placeholders that are matched to items in the received updated data items (320) can be instantiated with the matched items in the local data representation, and "item available" notifications can be sent. Additionally, if the overall count of items in the data set in the data source has changed (per information on the overall count being sent from the data source to the items manager or the data source returning the last data item in the data source list), then a count changed-type change notification can be sent to the client to indicate this change.

In the example of FIG. 3, the operations of the refresh technique discussed above can result in the original local data representation (310) at the top of FIG. 3 being updated to the updated local data representation (330) illustrated at the bottom of FIG. 3, and in appropriate change notifications being sent to the client. Other techniques could be used to do this in other ways that would be logical for the change notifications being sent at the time. For example, the order of the operations in the techniques discussed above could be changed so long as they still resulted in an orderly generation of the change notifications that can be properly processed by the client.

After the refresh operation has completed, the fetching of requested items for which there are still placeholders in the local data representation can resume. Such placeholders may have been present in the original local data representation (310), and/or they may have been inserted due to client requests for data during the refresh technique discussed above. For example, in the example of FIG. 3, this can result in fetching an item corresponding to the placeholder in the updated local data representation (330). Accordingly, items can be fetched properly even if results from requests to the data source initiated prior to the refresh operation are ignored to simplify keeping the local data representation consistent at the end of the refresh technique.

6. List Editor Interface and Optimistic Edits

Referring back to FIG. 2, edits can be supported if the data source (220) and the data source adapter (222) implement one or more editing methods. The items manager can wrap each of these methods, so the items manager (210) can update the data representation item list (256) synchronously, thereby allowing the user interface for the client (260) to be updated synchronously, even if the data source (220) performs updates requested by the client (260) asynchronously. These "optimistic" updates to the data representation item list will typically be correct (the optimistic updates will be correct if and when the requested edits succeed at the data source (220)), and the data source (220) can silently update the data item list (226) some time later without requiring further updates to the data representation item list (256) or visual feedback to the end user.

If an update to the data item list (226) fails, the items manager (210) can report the error to the client (260) and restore the data representation item list (256) to reflect that actual state of the data item list (226). For example, this may include undoing updates that have already been made to the data representation item list (256), and informing the client (260) that the updates have been undone. For example, the items manager (210) may inform the client (260) that a requested update is no longer meaningful (if it no longer makes sense, e.g., because another user has made a change in the data item list (226)), or that the update was not permitted (e.g., because the correct permissions were not in place for the update), and may undo any updates that have not yet been made. However, if a deletion fails, the items manager (210) may not flush the update queue, because future edits would generally not refer to the deleted item anyway. Also, the items manager (210) may not undo a deletion with a "no longer meaningful" failure, because such a failure would indicate that the item had already been deleted anyway.

In some situations, the data source (220) may become unavailable while requests for updates to the data item list (226) are pending. In such situations, the items manager (210) can retain optimistic updates that have already been made to the data representation item list (256), because those updates still might be performed by the data source (220). However, the items manager (210) can inform the client (260) that the data source (220) is unavailable. In such a situation, the client (260) may request refresh operations more often than usual and perhaps disallow further editing. Note that if a requested update does not get performed by the data source (220), the local data representation item list (256) can be brought into line with the data item list (226) when the next refresh operation is performed. Additionally, if some of the updates requested by the client (260) are no longer meaningful after a refresh operation, then the client (260) can be so informed by the items manager (210) when the refresh operation is done. The data source adapter (222) can determine when codes are to be issued for no longer meaningful updates, non-permitted updates, and the data source being unavailable. The data source adapter (222) can send these codes on to the items manager (210), and the items manager can send them on to the client (260).

7. Fetching Resources for Data Representation Items

In some configurations such as an HTML platform, the items manager (210) can rely on a web browser's mechanism for fetching resources for the data representation items (254) (e.g., images for the data representation items, etc.). For example, the resources may include resources associated with particular HTML tags, such as <img src="[URL]">, <iframe src="[URL]">, <script src="[URL]">, <input type="image" src="[URL]">, <video poster="[URL]">, and <object data="[URL]">, where "[URL]" refers to a uniform resource locator for the resource. When a data representation item (254) is instantiated by the item renderer (240) as a DOM tree, such resources referenced within the DOM tree can go into the browser's fetch queue. If the client (260) scrolls down through many pages, though, the resources that are currently visible on a display screen can be fetched first, instead of waiting at the back of the queue. To circumvent the browser logic in such a situation, the items manager (210) can hold off on calling the item renderer (240) to render a data representation item (254) until the resource queue has only a threshold number of entries. For example, if the browser allows six concurrent connections, six can be used as a threshold. The items manager (210) can create temporary copies of the user interface elements that require resources, and can attach onload handlers to these elements so the items manager (210) can know when the resources have been successfully fetched.

The items manager (210) can then determine which item to render (and therefore fetch the resources for) next. This determination can use internal logic of the items manager (210), and can rely on priority information from the client (260). For example, the client (260) can call a method telling the items manager (210) which items are "high priority" (such as those that are on-screen) and "medium priority" (such as those that are just off-screen), and the items manager (210) can assume that other items are "low priority". The items manager (210) can invoke the item renderer (240) to render the items in this priority order, from highest to lowest. As an example, the control (264) may call a method through the items manager interface (270), such as by making a call that can be represented by the following pseudo code: "void prioritize(Element first, Element last, Priority priority)", where "Element first" and "Element last" are the first and last items in a range of items, and "Priority priority" indicates the priority for that range.

8. Returning Placeholders for Data Representation Items

As has been discussed briefly above, if the client (260) sends the items manager (210) a request for an item representation that the items manager (210) has not yet retrieved from the data source (220), the items manager (210) can return to the client (260) a placeholder (255) until the items manager (210) successfully fetches the corresponding data item (224) from the data source (220). The items manager (210) may also include the placeholder (255) in the local data representation (250), where the placeholder (255) can be used for recordkeeping purposes, such as to be matched with a corresponding data representation item (254) when the corresponding data item (224) is returned from the data source (220). Additionally, the client (260) may use the placeholder (255) for various purposes such as recordkeeping and for displaying in lieu of the actual data representation item (254) until the data representation item (254) is returned.

In one implementation, the items manager (210) can expose to the client (260) the items manager interface (270), which can allow individual data representation items (254) to be fetched in various ways in response to different types of requests from the client (260), as discussed above. As discussed above, in response to calls to each of these request methods, the items manager (210) can return the requested data representation items (254) as user interface elements generated by the item renderer (240).

When one of these item request methods is called, the items manager (210) can first check to determine whether the items manager (210) already has the data for the given item cached in the local data representation (250), which may be in memory. If so, the items manager (210) might have already called the item renderer (240), in which case the items manager (210) can return the same user interface element again as the data representation item (254), or else the items manager (210) can call the item renderer (240) immediately and return the instantiated (e.g., rendered as a UI description that can be sent to the client) item to the client (260) as the data representation item (254).

Otherwise, the items manager (210) can call an appropriate method on the adapter (222), passing the adapter (222) a callback function that the adapter (222) can synchronously or asynchronously call to return the requested data items (224), as discussed above. The data source (220) may be capable of returning data items (224) quickly (such as where the data source (220) is a local data source) so that the adapter (222) can report the resulting data items (224) synchronously by calling back into the items manager (210) immediately (i.e., by calling the callback function synchronously).

The items manager (210) can detect when such a synchronous callback has happened. For example, the callback the items manager (210) passes to the adapter can store the data representation item (254) in a slot data structure created for the item. As discussed above, the items manager (210) can execute a calling function to call into the adapter. After executing the calling function, the items manager (210) may inspect the slot data structure to see if the data representation item (254) or the data item (224) has been stored there. If not, then the items manager (210) can know the request will be completed asynchronously, and a placeholder (255) can be created. This determination may be made again with each request for items, or it may be made just once or only periodically with a particular data source (220). Alternatively, the adapter (222) and/or the data source (220) may inform the items manager (210) whether the data source (220) is able to return items synchronously. Such overall determinations for a data source (220) or a group of data items (224) may be considered a determination for each data item (224) to which the determination applies.

If the callback function has been called back synchronously, the items manager (210) can call the item renderer (240) and return the instantiated item to the client (260) as a data representation item (254). This can be done without generating or providing a placeholder (255).

If the items manager (210) has not already received the requested data items (224), and the requested data items will not be returned synchronously, then an asynchronous call may be used to fetch the data items (224). To avoid redundant calls for the same data items (224), when a data fetch is initiated, an identifier for that fetch can be generated and added to a hash table. Placeholders (255) for data items (224) that are expected to be returned by the particular fetch can be added to slots in the local data representation (250) and labeled with this fetch identifier. When the fetch completes, whether it succeeded or failed, its identifier can be removed from the hash table.

Accordingly, there may be at least three sub-cases when a client (260) requests an as-yet-uninstantiated data representation item (254) from a data source (220) that is returning corresponding data items (224) asynchronously. First, the client (260) may have already requested the data representation item (254), in which case a placeholder (255) may already exist for the item, and that placeholder (255) can be returned. Second, the client (260) can be requesting a data representation item (254) for the first time, and the request from the client (260) can initiate an asynchronous request to the data source (220); a new placeholder (255) can also be generated and returned. Third, a client (260) can be requesting a data representation item (254) for the first time, but the request may be such that a corresponding request is not to be sent to the data source (220) until an earlier request to the data source (220) is fulfilled (e.g. the items manager (210) will be fetching the corresponding data items (224) after a given item, but that item is itself still only a placeholder (255)); a new placeholder (255) can be created and returned, and initiation of a fetch can wait until an appropriate time.

When data items (224) arrive from the data source (220), the items manager (210) can match the data items (224) to placeholders and call the item renderer (240) for any data items (224) that can now be instantiated. For each instantiation, the items manager (210) can send an itemAvailable notification to the client (260), passing to the client (260) references to an existing user interface element (the placeholder (255)) and a replacement user interface element (the data representation item (254)). The client (260) can respond by replacing the placeholder (255) with the data representation item (254). This replacement can result in the client (260) replacing a presentation (e.g., a display) of the placeholder (255) with a presentation (e.g., a display) of the data representation item (254). The items manager (210) can also check for placeholders (255) adjacent to the results received back from the data source (220), and can initiate new fetches for corresponding data items (224) if those items have not already been requested.

The items manager (210) can attempt to reduce the number of network round-trips to the data source (220), so the items manager (210) can count adjacent placeholders (255) and request data items (224) in batches. Accordingly, one request from the items manager (210) may be requesting data items (224) that were requested in multiple requests from the client (260). If a set of data items (224) received back from the data source (220) extend beyond the current set of placeholders (255), the extra data items (224) can be stored in slots in the local data representation (250) so that some future requests may be fulfilled synchronously with data representation items (254) representing those cached data items (224).

A data source (220) may be allowed to return more or fewer items than the items manager (210) requests. The approach described above can allow for this, although it is possible that some unnecessary fetches may be initiated by the items manager (210). To reduce this possibility, the items manager (210) may generally wait for data items (224) from one request to be returned before making the next request. This may also allow more of the data items (224) to be requested by their keys, rather than in other ways, such as solely by index. For example, the items manager (210) may wait in this manner as long as the requests are for adjacent data items (224) (with adjacency being determined in some manner, such as by the relative positioning of the data items (224) in a returned data item array). In which case, for example, if the items manager (210) received a data item (224) with a key of "A", the items manager (210) may then request the data item with a key of "A" (to provide some overlap in the requests for, e.g., detecting whether changes have been made to the data in the data source (220) between requests) and the next 10 items. But the items manager (210) may opt not to wait if one request and the next request after it are requesting data items (224) that are not adjacent to each other—because then the response to the first request would be unlikely to include data items (224) to be requested in the next request.

In some scenarios, the client (260) and the items manager (210) may not know the total number of data items in the dataset at the data source (220). Rather than require an end user to wait for a network round trip to determine the extents of the data before displaying any placeholders (255), the items manager can return placeholders (255) "speculatively". In other words, the items manager (210) can return such placeholders (255), speculating that the number of items in the dataset at the data source (220) is larger than what the client (260) will request before a count has been established. In the event that this speculation turns out to be wrong, some placeholders (255) may be removed because they do not actually correspond to data items (224). The items manager (210) can send the client (260) the same "removed" notification the items manager (210) would send if an item were actually deleted from the dataset. However, to give the client (260) the option of displaying a distinct animation for this situation (e.g. a subtle fade-out rather than a dramatic fly-away effect), an additional Boolean parameter (e.g., a parameter named "mirage") may be passed with the notification. Such a mirage parameter may indicate to the client (260) that as far as the items manager (210) has determined, there was not a data item (224) corresponding to the associated placeholder (255). This mirage Boolean may be useful in other circumstances, such as when two non-contiguous regions of the data items (224) have been instantiated as data representation items (254) and expanded until the regions "collide", but too many placeholders (255) have been created between the regions.

By combining the placeholder features of the items manager (210) with the data templating features of the placeholder renderer (242) and the item renderer (240), a programming interface between the client (260) and the items manager (210) can be simplified because the client (260) and items manager (210) can operate without separate handles to track identity. Instead, the items manager (210) can pass the client (260) a reference to the placeholder (255) and a reference to the requested data representation item (254), instructing the client (260) to replace the placeholder (255) with the data representation item (254) (e.g., with an itemAvailable notification). A client (260) can unconditionally insert the values (data representation items (254) and/or placeholders (255)) returned by calling one of the request methods (firstItem, etc.) at the appropriate location in the user interface data structure (e.g., a DOM tree) of the client (260), and later swap out any placeholders (255) when notified to do so by the items manager (210). Thus, the client (260) can interact with the items manager (210) as if the client (260) were interacting with a synchronous data source, whether or not the actual data source (220) can provide synchronous responses to data requests.

In an alternate design, the items manager (210) (rather than the client (260)) could maintain a user interface data structure. For example, where the user interface data structure is a DOM tree, the client (260) could receive a data representation item (254) as a DOM element and could assume that the DOM element has children corresponding to the items in a complete list beneath that DOM element. The client (260) could use the items manager (210) instead of a DOM interface to navigate from one child to the next. The items manager (210) could include placeholders (255) and replace them with data representation items (254) in the DOM tree itself. In this manner, the items manager (210) could navigate back and forth along the children, and could update the children with placeholders (255) and later with data representation items (254) when the data representation items (254) become available. The environment (200) could also include one or more data structures for recordkeeping, such as data structures to track one or more locations in a list of the data representation items (254).

III. Data Items Manager Techniques

Several data items manager techniques will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
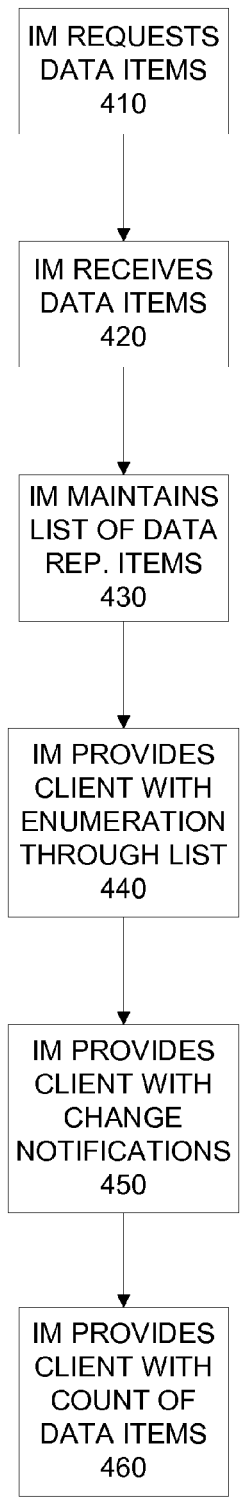
FIG. 4 is a flowchart of a data items manager technique.

Referring to FIG. 4, a data items manager technique will be described. In the technique, an items manager can request (410) data items from a data source via a data source adapter, and can receive (420) data items back from the data source via the data source adapter. Additionally, the items manager can maintain (430) a list of data representation items representing data items received from the data source, and provide (440) a client with an enumeration through the list of data representation items.

The data representation items can be user interface elements, and maintaining (430) the list of data representation items can further include invoking a renderer to render the user interface elements from the data items received from the data source. Maintaining (430) the list may also include including the user interface elements in the list. Providing (440) the client with the enumeration through the list can include, for at least one of the data representation items, requesting resources for the data representation item, waiting for the resources to load, and providing the data representation item to the client after the resources are loaded. Maintaining (430) the list of data representation items can further include receiving from the client one or more priority designations for one or more of the data representation items, and loading resources for the data representation items in a sequence dictated by the priority designation(s).

Maintaining (430) the list of data representations can include dehydrating state of a data representation item in the list. For example, the state can be changes made in response to user input that can be dehydrated by being stored in a location, such as in memory and/or long-term storage. The state can represent changes to the data representation item, such as changes in response to user input. The items manager can remove the data representation from the list (e.g., by deleting the representation and/or removing the entire list from memory), and can re-insert the data representation item back into the list later. The items manager can rehydrate the state back into the data representation item. This may be done before or after the data representation item is re-inserted in the list. In this way, changes to the data representation item can be maintained. For example, user interface changes made to the data representation in response to user input may be maintained, even if the data representation item is deleted from and later re-inserted into the data representation item list. Hydration can allow user input changes to be maintained with decreased memory costs because aspects of the user interface data structure can be discarded, and those aspects can be recreated if they are to be used later. Additionally, hydration can allow the state to be converted to a form that can be serialized for long-term storage, such as a form that does not include pointers that only have meaning in the user interface data structure's current form in memory.

The items manager can interact with the client through a first interface, and can interact with the data source adapter through a second interface. The items manager may also interact with an item renderer and a placeholder renderer through third and fourth interfaces, respectively.

The items manager may receive (420) the data items asynchronously from the data source, and providing (440) the client with the enumeration through the list of data representation items can include providing the client with a synchronous enumeration through the list of data representation items. For example, providing the client with this synchronous enumeration may include providing the client with one or more placeholders while waiting for one or more data representation items corresponding to the placeholder(s) to become available to the items manager. Additionally, providing the client with the synchronous enumeration may include, when the data representation item(s) corresponding to the placeholder(s) become available, providing those data representation item(s) to the client and instructing the client to replace the placeholder(s) with the data representation item(s).

The technique of FIG. 4 can further include the items manager providing (450) the client with notifications of changes to the list of data representation items. The items manager can generate the notifications of changes by comparing a first data representation comprising one or more data representation items and a second data representation comprising one or more data representation items.

Maintaining (430) the list of data representation items may include receiving a set of one or more requests from the client to make one or more edits to the list of data representation items. The items manager can send the request(s) to the data source to make the edit(s) to a list of data items represented by the data representation items. The items manager can make the edit(s) to the list of data representation items and inform the client that the edit(s) have been made, without waiting for the data source to respond to the request(s). If the data source completed the edit(s) to the list of data items, then the edits to the list of data representation items can be retained. If the data source failed to complete the edit(s) to the list of data items, then the edit(s) to the list of data representation items can be undone.

Maintaining (430) the list of data representation items can include requesting a number of data items from the data source, and receiving a different number of data items (either more or less than the number requested) back from the data source in response. The items manager can also update the list of data representation items with data representation items representing the different number of data items received back from the data source.

Maintaining (430) the list of data representation items can include requesting subsets of data items from a list of data items at the data source, where the subsets overlap each other. The items manager may be able to identify items requested from the data source using identifiers selected from a group consisting of data item indices, data item keys, and combinations of data item indices and data item keys.

The list of data representation items can represent a portion of a list of data items at the data source. Maintaining (430) the list of data representation items can include fetching additional data items from the list of data items as data representation items are requested by the client, and releasing data representation items that are no longer being used by the client. The technique of FIG. 4 may further include the items manager providing (460) the client with a count of items in the list of data items at the data source.

Figure 5:
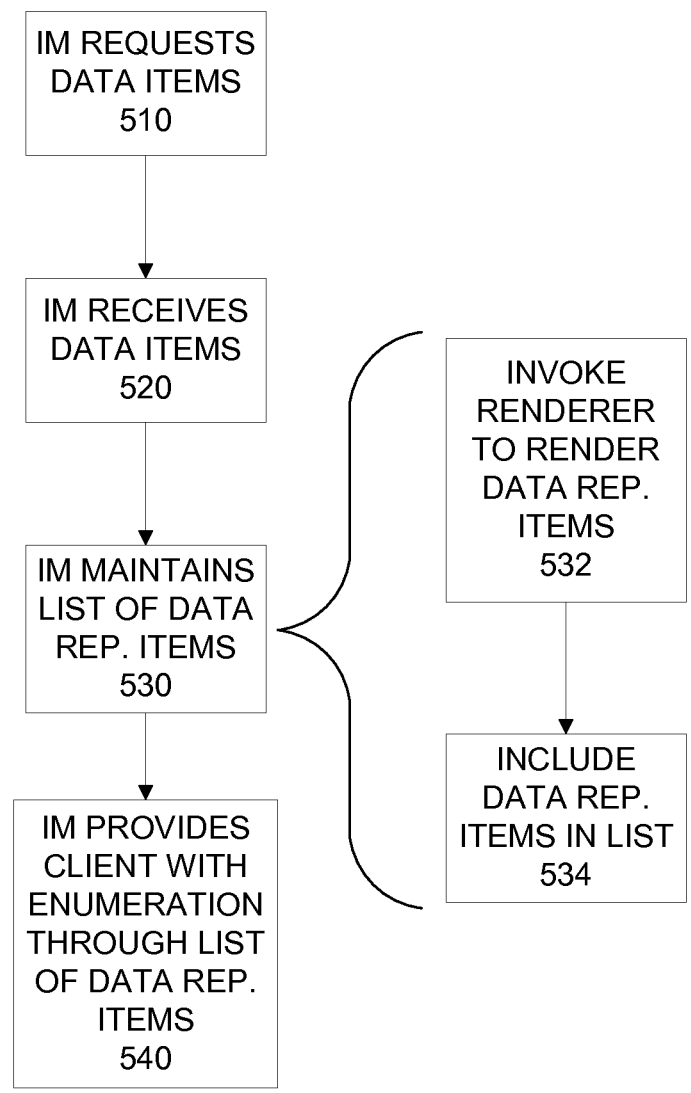
FIG. 5 is a flowchart of another data items manager technique.

Referring to FIG. 5, another data items manager technique will be described. The technique can include the items manager requesting (510) data items from a data source via a data source adapter, and receiving (520) data items back from the data source via the data source adapter. The items manager can maintain (530) a list of data representation items representing data items received from the data source, where the data representation items include user interface elements. Maintaining (530) the list can include invoking (532) a renderer to render the data representation items from the data items received from the data source, and including (534) the data representation items in the list. Moreover, maintaining (530) the list can include receiving from the client one or more priority designations for one or more of the data representation items, and loading resources for the data representation items in a sequence dictated by the priority designation(s). The items manager can also provide (540) the client with an enumeration through the list of data representation items.

Figure 6:
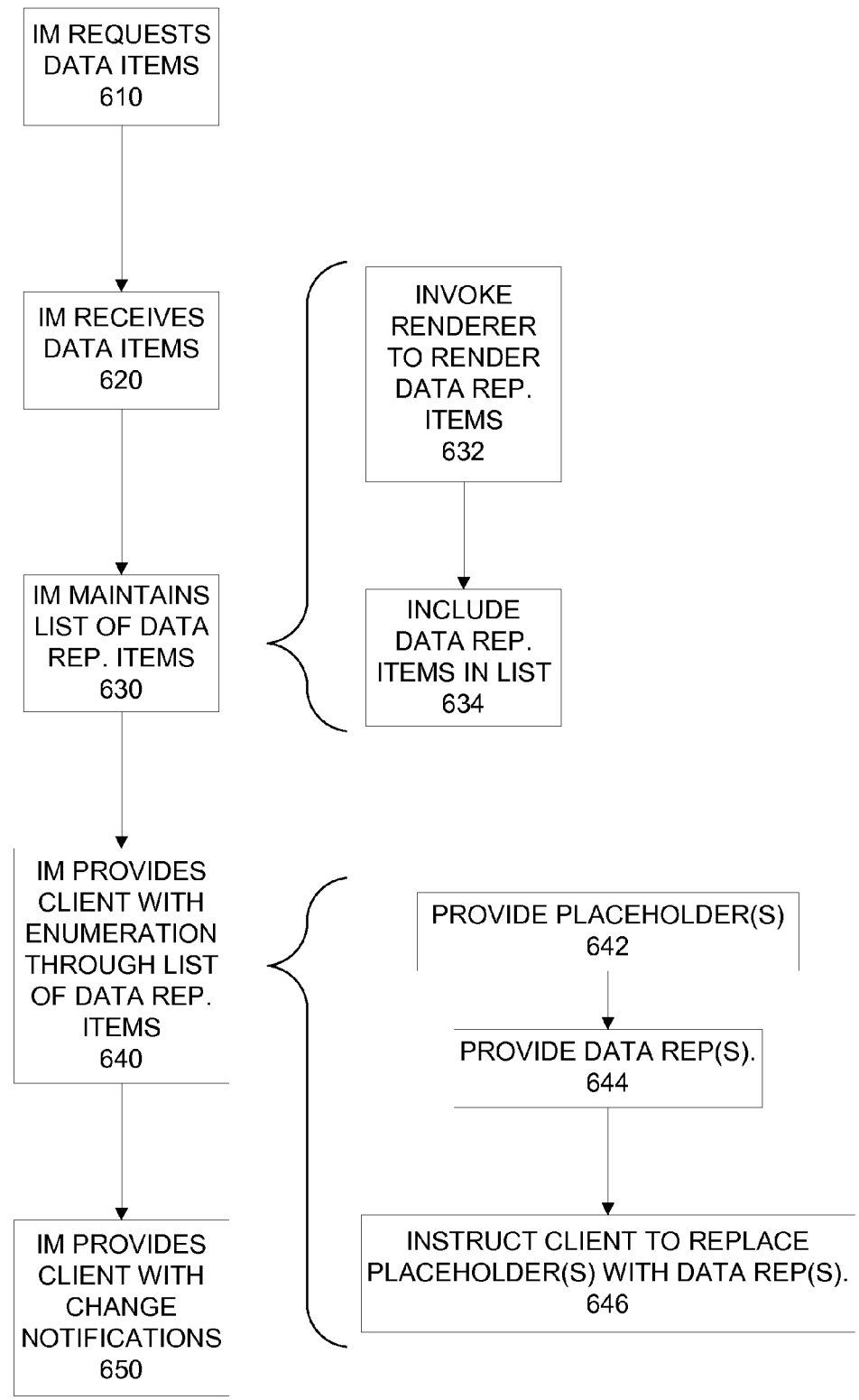
FIG. 6 is a flowchart of yet another data items manager technique.

Referring to FIG. 6, yet another data items manager technique will be described. The technique of FIG. 6 can include requesting (610) data items from a data source via a data source adapter, with requests for the data items being made through an interface between an items manager and the data source adapter. The technique can also include receiving (620) data items from the data source via the data source adapter. A list of data representation items representing data items received from the data source can be maintained (630), where the data representation items can include user interface elements. Maintaining (630) the list can include invoking (632) a renderer to render the data representation items the data items received from the data source, and including (634) the data representation items in the list. The renderer can be invoked (632) through an interface between the items manager and the renderer. For example, the renderer may be a function that is called by the items manager.

The technique of FIG. 6 can further include providing (640) a client with an enumeration through the list of data representation items, the enumeration being provided through an interface between the items manager and the client. Providing (640) the client with the enumeration can include providing (642) the client with one or more placeholders while waiting for one or more data representation items corresponding to the placeholder(s) to become available to the items manager. When the data representation item(s) corresponding to the placeholder(s) become available to the items manager, then the items manager can provide (644) the data representation item(s) to the client and instruct (646) the client to replace the placeholder(s) with the data representation item(s). The technique of FIG. 6 can further include providing (650) the client with notifications of changes to the list of data representation items.

Maintaining (630) the list of data representation items can include receiving a set of one or more requests from the client to make one or more edits to the list of data representation items; sending one or more requests to the data source to make the edit(s) to a list of data items represented by the data representation items; making edit(s) to the list of data representation items and informing the client that edit(s) have been made, without waiting for the data source to respond to the request(s) to the data source; determining whether the data source completed the edit(s) to the list of data items; if the items manager determines that the data source completed the edit(s) to the list of data items, then retaining the edit(s) to the list of data representation items; and if the items manager determines that the data source failed to complete the edit(s) to the list of data items, then undoing the edit(s) to the list of data representation items.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   requesting data items, by an items manager, from a data source via a data source adapter;
   receiving, by the items manager, data items from the data source via the data source adapter;
   maintaining, by the items manager, a list of data representation items representing data items received from the data source, wherein maintaining the list of data representation items comprises the items manager performing the following acts:
      dehydrating state of a data representation item in the list, the state representing one or more changes to the data representation item in response to user input, and the dehydrating comprising storing the state in storage;
      removing the data representation item from the list;
      re-inserting the data representation item back into the list; and
      rehydrating the state from the storage back into the data representation item, the state of the data representation item that is stored as part of the dehydrating being the same as the state of the data representation item after rehydrating the state from the storage back into the data representation item; and
   providing, by the items manager, a client with an enumeration through the list of data representation items.

2. The method of claim 1, wherein the data representation items are user interface elements, and wherein maintaining the list of data representation items comprises:
   invoking a renderer to render the user interface elements from the data items received from the data source; and
   including the user interface elements in the list.

3. The method of claim 1, wherein providing the client with the enumeration through the list of data representation items comprises performing the following acts by the items manager:
   receiving from the client one or more priority designations for one or more of the data representation items; and
   loading resources for the one or more data representation items in a sequence dictated by the one or more priority designations, the resources for the one or more data representation items being different from the one or more data representation items, the resources for the one or more data representation items being referenced from within the one or more data representation items, and the one or more data representation items being configured to be used by the client along with the resources for the one or more data representation items.

4. The method of claim 1, wherein the items manager interacts with the client through a first set of one or more interfaces, and the items manager interacts with the data source adapter through a second set of one or more interfaces, the first set of one or more interfaces and the second set of one or more interfaces being different from each other.

5. The method of claim 1, wherein the items manager receives the data items asynchronously from the data source, and wherein providing the client with the enumeration through the list of data representation items comprises providing the client with a synchronous enumeration through the list of data representation items.

6. The method of claim 5, wherein providing the client with the synchronous enumeration through the list of data representation items comprises the performing the following acts by the items manager:
   providing the client with one or more placeholders while waiting for one or more data representation items corresponding to the one or more placeholders to become available to the items manager; and
   when the one or more data representation items corresponding to the one or more placeholders become available, then providing the one or more data representation items to the client and instructing the client to replace the one or more placeholders with the one or more data representation items.

7. The method of claim 1, wherein the method further comprises providing, by the items manager, the client with notifications of changes to the list of data representation items.

8. The method of claim 7, wherein the items manager generates the notifications of changes by comparing a first data representation comprising one or more data representation items and a second data representation comprising one or more data representation items.

9. The method of claim 1, wherein maintaining the list of data representation items comprises performing the following acts by the items manager:
   receiving a set of one or more requests from the client to make one or more edits to the list of data representation items;
   sending one or more requests to the data source to make the one or more edits to a list of data items represented by the data representation items;
   making the one or more edits to the list of data representation items and informing the client that the one or more edits have been made, without waiting for the data source to respond to the one or more requests;
   determining whether the data source completed the one or more edits to the list of data items;
   if it is determined by the items manager that the data source completed the one or more edits to the list of data items, then retaining the edits to the list of data representation items; and if it is determined by the items manager that the data source failed to complete the one or more edits to the list of data items, then undoing the one or more edits to the list of data representation items.

10. The method of claim 1, wherein maintaining the list of data representation items comprises performing the following by the items manager:
   requesting a requested number of data items from the data source, the number of data items being indicated to the data source by the items manager;
   receiving a different number of data items back from the data source in response to the requesting of the requested number of data items from the data source, the different number of data items being greater than the requested number of data items; and
   updating the list of data representation items with data representation items representing the different number of data items received back from the data source.

11. The method of claim 1, wherein maintaining the list of data representation items comprises requesting subsets of data items from a list of data items at the data source, the subsets overlapping each other.

12. The method of claim 1, wherein the items manager is able to identify items requested from the data source using identifiers selected from a group consisting of data item indices, data item keys, and combinations of data item indices and data item keys.

13. The method of claim 1, wherein the list of data representation items represents a portion of a list of data items at the data source, and maintaining the list of data representation items comprises:
   fetching additional data items from the list of data items as data representation items are requested by the client; and
   releasing data representation items that are no longer being used by the client.

14. The method of claim 13, further comprising the providing, by the items manager, the client with a count of how many items are in the list of data items at the data source, the count of how many items are in the list of data items at the data source being different from a count of how many items are in the list of data representation items maintained by the items manager.

15. The method of claim 1, wherein the items manager providing the client with the enumeration through the list of data representation items comprises, for at least one of the data representation items, performing the following acts by the items manager:
   requesting resources for the data representation item, the resources for the data representation item being referenced from within the data representation item, the resources for the data representation item being different from the data representation item;
   waiting for the resources for the data representation item to load; and
   providing the data representation item to the client after the resources for the data representation item are loaded, the data representation item being configured to be used by the client along with the resources for the data representation item after the resources for the data representation item are loaded.

16. A computer system comprising:
   at least one processor; and
   at least one memory comprising instructions stored thereon that when executed by the at least one processor cause the at least one processor to invoke an items manager that is separate from a client and separate from a data source to perform acts comprising:
      requesting data items, by an items manager, from a data source via a data source adapter;
      receiving, by the items manager, data items from the data source via the data source adapter;
      maintaining, by the items manager, a list of data representation items representing data items received from the data source, wherein maintaining the list of data representation items comprises the items manager performing the following acts:
         dehydrating state of a data representation item in the list, the state representing one or more changes to the data representation item in response to user input, and the dehydrating comprising storing the state in storage;
         removing the data representation item from the list;
         re-inserting the data representation item back into the list; and
         rehydrating the state from the storage back into the data representation item, the state of the data representation item that is stored as part of the dehydrating being the same as the state of the data representation item after rehydrating the state from the storage back into the data representation item; and
      providing, by the items manager, a client with an enumeration through the list of data representation items.

17. The system of claim 16, wherein providing the client with the enumeration through the list of data representation items comprises performing the following acts by the items manager:
   receiving from the client one or more priority designations for one or more of the data representation items; and
   loading resources for the one or more data representation items in a sequence dictated by the one or more priority designations, the resources for the one or more data representation items being different from the one or more data representation items, the resources for the one or more data representation items being referenced from within the one or more data representation items, and the one or more data representation items being configured to be used by the client along with the resources for the one or more data representation items.

18. The system of claim 16, wherein maintaining the list of data representation items comprises performing the following acts by the items manager:
   receiving a set of one or more requests from the client to make one or more edits to the list of data representation items;
   sending one or more requests to the data source to make the one or more edits to a list of data items represented by the data representation items;
   making the one or more edits to the list of data representation items and informing the client that the one or more edits have been made, without waiting for the data source to respond to the one or more requests;
   determining whether the data source completed the one or more edits to the list of data items;
   if it is determined by the items manager that the data source completed the one or more edits to the list of data items, then retaining the edits to the list of data representation items; and
   if it is determined by the items manager that the data source failed to complete the one or more edits to the list of data items, then undoing the one or more edits to the list of data representation items.

19. The system of claim 16, wherein the acts further comprise providing, by the items manager, the client with notifications of changes to the list of data representation items, and wherein the items manager is configured to generate the notifications of changes by comparing a first data representation comprising one or more data representation items and a second data representation comprising one or more data representation items.

20. One or more computer-readable storage media having computer-executable instructions embodied thereon that, when executed by at least one processor, cause the at least one processor to perform acts comprising:

requesting data items, by an items manager, from a data source via a data source adapter;

receiving, by the items manager, data items from the data source via the data source adapter;

maintaining, by the items manager, a list of data representation items representing data items received from the data source, wherein maintaining the list of data representation items comprises the items manager performing the following acts:

dehydrating state of a data representation item in the list, the state representing one or more changes to the data representation item in response to user input, and the dehydrating comprising storing the state in storage;

removing the data representation item from the list;

re-inserting the data representation item back into the list; and rehydrating the state from the storage back into the data representation item, the state of the data representation item that is stored as part of the dehydrating being the same as the state of the data representation item after rehydrating the state from the storage back into the data representation item; and providing, by the items manager, a client with an enumeration through the list of data representation items.

* * * * *